Dec. 21, 1943.   C. A. YOUNG   2,337,144

CURVE GENERATING MECHANISM

Filed April 1, 1941

Inventor
Clyde A. Young
By Blackmore, Spencer & Flint
Attorneys

Patented Dec. 21, 1943

2,337,144

UNITED STATES PATENT OFFICE 2,337,144

CURVE GENERATING MECHANISM

Clyde A. Young, Downers Grove, Ill.

Application April 1, 1941, Serial No. 386,330

12 Claims. (Cl. 33—27)

The present invention relates generally to mechanisms for generating geometric curves and more particularly relates to a mechanism for direct generation of involute curves.

The usual well known methods for constructing involute or cycloidal curves, such as the point by point layout method, basic rack generation, or the use of templates, require lengthy and involved operations, and any of these methods, as is well known, are subject to errors.

The object, therefore, of the present invention is the provision of a simple and inexpensive mechanism which may be readily supported directly on the work or member so that involute or cycloidal curves or surfaces may be accurately and quickly generated directly on the work or member.

Another object is the provision of adjustable elements in the mechanism whereby involute or cycloidal curves or surfaces corresponding to various diameter circles may be accurately and quickly generated.

The mechanism by which the above objects are accomplished and additional advantages provided by the mechanism will be better understood by referring to the following detailed description of the mechanism which I have shown as an adjustable type. However, a non-adjustable type will also be discussed along with the type illustrated in the drawing.

Figure 1 of the drawing shows a plan view of the mechanism,

Figure 1:
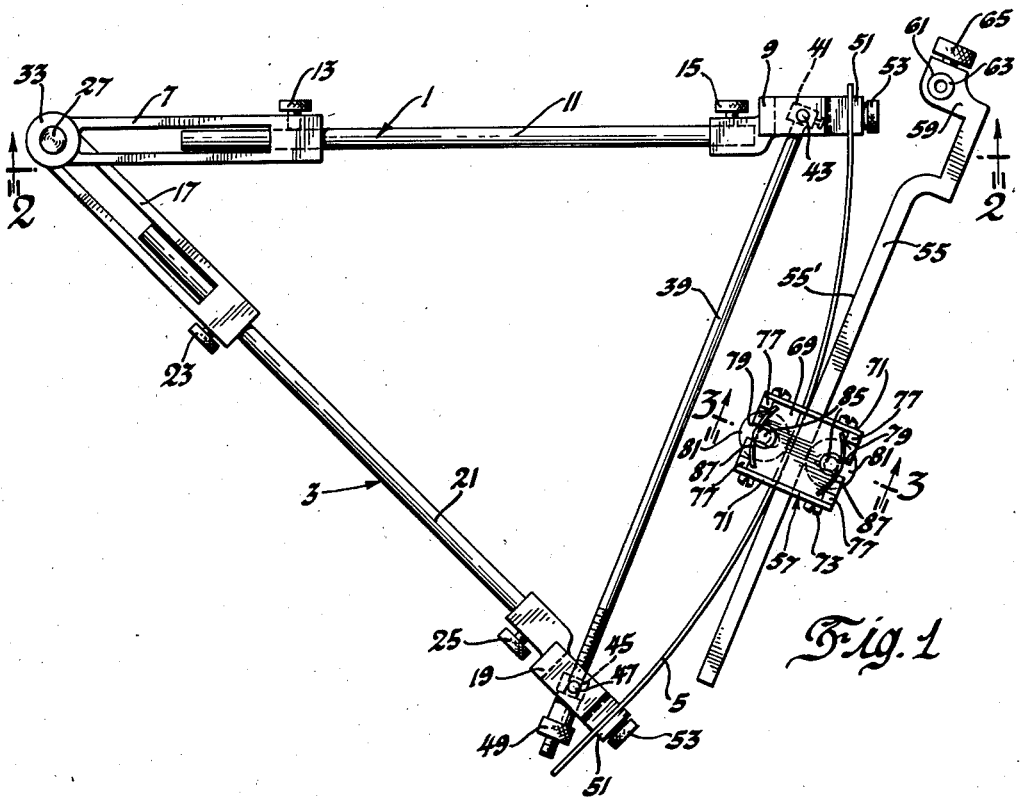

Referring now to Figure 1, the mechanism includes a frame comprising a pair of interconnected adjustable arms shown generally at 1 and 3 and a member 5 of uniform rectangular cross sectional area and of arcuate form attached to the arms so that the general outline of the frame is that of a sector of a circle. Each of the arms 1 and 3 includes three telescopic elements, the arm 1 including end pieces 7 and 9, each of which is provided with a suitable recess in which the opposite ends of a rod 11 may be inserted and fixed therein by means of thumb screws 13 and 15. The three corresponding elements of the arm 3 are the end pieces 17 and 19 likewise provided with recesses in which the opposite ends of the rod 21 may be inserted and fixed therein by means of the thumb screws 23 and 25. The end pieces 7 and 17 are pivotally connected at one end by a pin 27 having an enlarged diameter portion 29 and a conical center point 31 formed on one end (see Figure 2) and a threaded portion on the opposite end on which a knurled clamp nut 33 is carried to prevent relative angular movement of the end pieces and arms 1 and 3 when the nut is tightened. As shown clearly in Figure 1 the recesses in the end pieces 7 and 17 in which one end of each of the rods 11 and 21 is inserted are of sufficient depth so that the length of the arms 1 and 3 may be varied. Each of the end pieces 9 and 19 is provided with extensions or feet 35 (see Figure 2) which, together with the conical center point 31 of the pin 27 carried by the end pieces 7 and 17, serve to support the arms 1 and 3 and the member 5 comprising the frame in parallel relation with respect to the work on which a curve or surface is to be generated.

Figure 2:
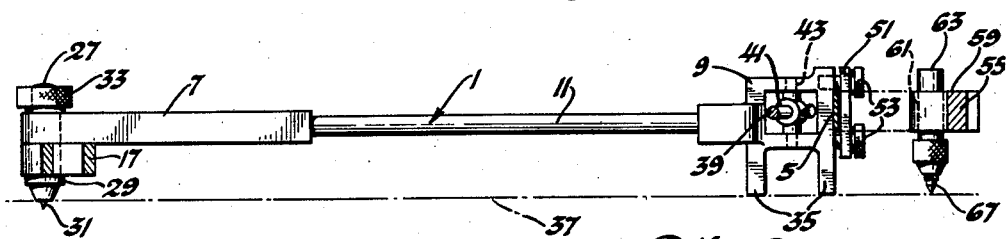
Figure 2 is a sectional view taken on line 2—2 of Figure 1.

The surface of the work is indicated by a line 37 in Figure 2. A tie rod 39 serves to connect the end pieces 9 and 19. One end of the tie rod is fixed to a swivel block 41 shown located in a suitable opening in the end piece 9 and pivotally connected thereto at point 43. The other end of the tie rod is threaded and extends through a suitable opening in another swivel block 45 carried in a similar opening in the end piece 19, the swivel block 45 being pivotally connected thereto at point 47. An adjusting nut 49 carried on the threaded end of the rod 39 serves to adjust the distance between the end pieces 9 and 19 and vary the angle between the arms 1 and 3.

As has been previously mentioned the member 5 is fixed to the outer ends of the arms, the ends of the member 5 being rigidly clamped to the outer end surface of the end pieces 9 and 19. If desired, these end surfaces may be provided with recesses of slightly less depth than the thickness of the member 5 and of a width such that the ends of the member 5 may be snugly inserted therein, and clamp bars 51 having openings through which thumb screws 53 extend into tapped openings in the end pieces are provided, so that clamp bars may be drawn tightly against the end portions of the member 5 to firmly hold these portions in contact with the outer ends of the end pieces. The arms 1 and 3 and the member 5 when so assembled constitute a rigid adjustable frame which may be supported on the work, as previously described, by means of the conical center point 31 and the extensions or feet 35 on the surface 37 of the work.

The member 5 may be either preformed to a circular arc form of a given radius of curvature or this member may be a flat blade spring.

Where the member is preformed to a given radius of curvature the length of each arm is adjusted so that the distance from the outer arcuate surface of the member 5 to the center of the pin 27 pivotally connecting the arms is equal to the radius of curvature of the member 5 so that the member may be clamped to these arms without causing distortion of the member. It will be evident that non-adjustable frame members may also be used where the member 5 is preformed or this member may form part of a unitary frame. Where a flat blade spring is used for the member 5 the radius of curvature of the member may be adjusted by means of the adjustable frame members shown in the following manner.

With the member 5 clamped to the end pieces 9 and 19 by means of the clamp screws 53, if each of the arms 1 and 3 be adjusted by means of the rods 11 and 21 and thumb screws 13, 15, 23 and 25 so that the distance from the outside surface of the member 5 to the center point 31 of the pin 27 connecting the arms, and with the arms set at any convenient angle with respect to each other, the member 5 will be bent into a circular arc of a radius equal to the distance from the outside surface of the member 5 to the center point 31.

It will be evident that with both ends of the member 5 rigidly clamped, the member 5 can exert no force tending to increase the angle between the arms, and the member will accordingly be retained in the form of an arc of a circle. It has been found that the tie rod 39 and adjusting nut 49 provide a means whereby the spring member 5 may be easily and accurately adjusted to conform to any shape other than a true circular arc shape. The above described adjustable frame enables preformed members of different radii of curvature to be supported thereon and also enables flexible members to be adjusted to any desired radius of curvature corresponding to the radius of curvature of any pitch or base circle desired, or to any desired modifications thereof. The base or pitch circle may be scribed on the work and the center point 31 of the frame placed in the center of the circle and a flexible member 5 adjusted to conform exactly to a portion of the circumference of the base or pitch circle.

The means shown by which a curve or surface may be generated on the work corresponding to a given base or pitch circle comprises a tangent bar 55 of uniform rectangular cross sectional area and means shown generally at 57, supported on both the member 5 and bar 55 and movable with respect to both to cause a flat surface 55' of the bar 55 to roll without sliding on the outer arcuate surface of the member 5 without causing any distortion or bending of the member.

The tangent bar 55, shown, has an offset end portion 59 in which a hole 61 is drilled so that the shank of a tool holder or chuck 63, shown in Figure 2, may be inserted and locked therein by means of the thumb screw 65. The center line of the hole 61 is located in the plane of the surface 55', and it will be evident that all points in the plane of this surface, and therefore the tool holder or chuck 63, will describe an involute curve when this surface is caused to roll without sliding on the outer arcuate surface of the member 5 when this member is in the form or shape of a true circular arc. Any type of tool may be carried by the chuck 63 other than the scriber 67 shown in Figure 2 by which a curve or surface may be generated directly on the work.

Figure 3:
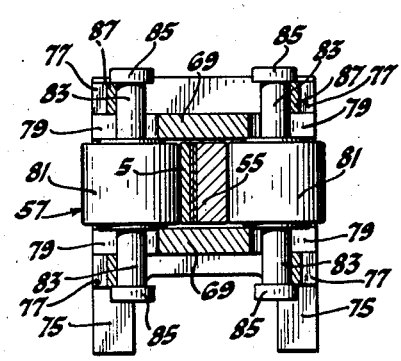
Figure 3 is a sectional view taken on line 3—3 of Figure 1.

The movable means 57, referred to above, for causing the surface 55' of the tangent bar 55 to roll without sliding on the outer arcuate surface of the member 5 without causing distortion thereof comprises a pair of side plates 69 and a pair of end plates 71 attached thereto by screws 73 to form a hollow frame. The end plates are provided with extensions or feet 75 for supporting this means or frame on the surface 37 of the work, as best shown in Figure 3. The end plates are provided with suitable openings through which the member 5 and tangent bar 55 extend. Each of the side plates 69 is provided with outwardly extending abutments 77 located at each corner thereof, and the side plates 69 are also provided with spaced slots 79 extending inwardly from opposite sides of these plates, on the center line thereof, in which a pair of rollers 81 are rotatably mounted. Each of the rollers 81, as best shown in Figure 3, is provided with axially extending pivot portions 83 which are rotatably guided in the slots 79 and which project outwardly therefrom and are shown provided with enlarged end portions 85. As best shown in Figures 1 and 2, suitably formed blade springs 87 having their end portions in contact with the abutments 77, and their central portions abutting the roller pivot portions 83 adjacent the enlarged diameter end portions 85 thereof, serve to urge the rollers toward each other and also serve to prevent endwise movement of the rollers 81 with respect to the side plates 69. As one roller bears on the outer surface of the tangent bar and the other bears on the inner surface of the member 5 adjacent the point of tangency of the tangent bar with respect to the memebr 5, the tangent bar is, accordingly, held in firm tangential line contact with the member 5, and as the forces exerted by the springs and rollers are equal and opposite, no distortion of the member 5 can occur due to these forces. With the above described arrangement the surface 55' of the tangent bar 55 is retained in firm tangential line contact with the outer surface of the member 5 by the springs and rollers and the means 57 may easily be moved with respect to both the tangent bar 55 and member 5 to cause the tangent bar to roll without slipping on the member without causing distortion of the member due to the manner in which the force is applied by the springs and rollers. Where necessary the surface 55' of the tangent bar and/or the surface of the member 5 on which the bar rolls may be coated with any suitable material to prevent sliding action between these surfaces.

With the parts of the mechanism assembled as described it will be evident that any suitable tool may be guided by this mechanism so that an accurate involute curve or surface may be generated directly on the work corresponding to the selected radius of curvature of the member 5. Any form of tool may be used which will machine, burn or grind the involute curve or surface, and an indicator may then be substituted for the tool to check the accuracy of the curve or surface generated.

It will be obvious that with the adjustable frame shown, a member of any shape or form may be preformed and attached to the frame, or a flexible member may be bent and held to any desired shape or form and by providing means for causing a second member having a surface of any given shape or form to roll without sliding on the first named member any desired curve or surface may be generated, such as cycloidal curves or involute curves for circular or polygonal figures or any desired modifications of any of these curves. For example, the flexible or preformed member may conform to a portion of a base or pitch circle, and a second member such as the tangent bar, shown, may be used for generating an involute curve or surface, or the second member may be a circular band, a point in which will generate a cycloidal curve when rolled without slipping on the flexible or preformed member. The preformed member may also be provided with an involute surface and the second member may be a tangent bar which when rolled thereon without slipping will generate an involute curve or surface of the second order.

It will likewise be evident that magnetic means attached to or forming a part of either the flexible or preformed member, or the member adapted to roll thereon may be used to exert attractive force between the members so that one member may be rolled on the other without slipping and without causing distortion of either of the members.

I claim:

1. In a mechanism of the type described comprising a pair of members having smooth surfaces engageable in single line contact only and force exerting means movably supported by said members to urge the surfaces of said members into non-slipping contact and to cause one member to be rolled without slipping on the other member so that a point in the member rolled generates a curve.

2. In a mechanism of the type described comprising a pair of members having smooth surfaces engageable in single line contact only and means movable with respect to both of said members to cause the surface of one member to roll without slipping on the surface of the other member whereby a point in the member rolled generates a curve said means being movably supported on both of said members and including resilient means for urging the surfaces of said members into non-slipping rolling line contact.

3. In a mechanism of the type described comprising a pair of members having single line contact engaging surfaces and surfaces on each of said members parallel to said engaging surfaces, and means to exert an equal and opposite force normal to each of said surfaces parallel to said engaging surfaces adjacent the point of contact thereof to retain said engaging surfaces in non-slipping rolling relation, said means being movable on said members to cause one member to be rolled without slipping on the other member so that a point in the member rolled generates a curve.

4. In a mechanism of the type described comprising a frame including a plurality of interconnected adjustable members, one of said members being flexible so that it may be bent and held into different shapes by adjustment of the other members, a tool supporting member adapted to be supported in non-slipping rolling contact with said flexible member, a tool supported by the tool supporting member and a clamping device movably mounted on said flexible member and tool supporting member for causing the tool supporting member to roll without slipping on said flexible member whereby the tool is caused to generate curves.

5. In a mechanism of the type described comprising a frame including a pair of interconnected angularly movable members of adjustable length or radius and a member having at least one curved surface attached to said first named members, means adapted to be supported in non-slipping rolling contact with said curved surface of said last named member for generating a curve, and clamping means movably contacting said last named frame member and curve generating means to cause said means to roll without slipping on said member.

6. In a mechanism of the type described comprising a fixed member having a supporting surface, a movable member having a surface adapted to engage the supporting surface of the fixed member in single line contact only and roll thereon so that a point in said movable member generates a curve, a work performing tool fixed at said point on said member for operating on a work piece and means movably mounted on both said fixed and movable member and engaging each member in single line contact only for causing said movable member to roll without slipping on the fixed member.

7. In a mechanism for generating a curve comprising a fixed member having a smooth surface, a movable member having a smooth surface engageable in only single line rolling contact with the smooth surface of said first member so that a point therein generates a curve, and means engaging both said fixed and movable member in single line contact only to maintain the smooth surfaces of both members in non-slipping rolling contact.

8. In a mechanism for generating a curve comprising a fixed supporting member, a movable member adapted to be engaged in single line contact only with and to be rolled on said supporting member so that a point on said movable member generates a curve, and means movably supported on both the fixed member and movable member to maintain both of these members in non-slipping rolling contact, said means contacting both of said members at one point only, said points being located at points on either side of the point of rolling contact between the members and movable thereon to cause the movable member to roll without slipping on said fixed supporting member.

9. In a mechanism of the type described comprising a stationary frame which includes a member of circular arc shaped form, a tangent bar adapted to roll on said member so that all points in the tangent bar surface rolling on the member generate involute curves, a tool connected to said bar at one of said points to operate on a work piece and movable means for continuously urging said tangent bar in non-slipping tangential rolling contact on said member.

10. In an adjustable mechanism of the type described comprising an adjustable frame adapted to be supported on the work piece, said frame comprising a pair of arms pivotally interconnected and of adjustable length and angularly movable with respect to each other, a flexible member of uniform cross sectional area carried by said arms in such manner that it may readily be bent and held in an arcuate shape, a rigid member adapted to roll on said flexible member without slipping, a tool attached to said rigid member for operating directly on the work piece, and movable means associated with said flexible member and said means adapted to roll thereon, to exert continuous tractive force therebetween and to cause non-slipping rolling motion of said means on said flexible member.

11. In an adjustable mechanism for generating curves comprising an adjustable frame which includes a pair of variable length arms pivotally connected at one end and having clamping means at the other ends thereof and a flexible member adapted to be bent into the form of a true circular arc of given curvature or modification thereof and retained in such form when said flexible member is rigidly fixed to said arms by the clamping means, a tangent bar adapted to be supported in non-slipping rolling contact on said member for generating involute curves or modifications thereof, and movable clamping means supported on said flexible member and bar to cause the bar to rock without slipping on the flexible member so that a point in the bar generates an involute curve.

12. In an adjustable mechanism for generating curves comprising a frame including a flexible member, a pair of arms of variable length, each of said arms having clamping means at one end for fixing said flexible member thereto and pivotally connected together at their other ends for angular adjustment, adjustable means interconnecting said arms for varying the angle therebetween to cause said flexible member to be bent and held in the form of a true circular arc, a tangent bar adapted to be supported in non-slipping rolling contact on said flexible member to generate involute curves, and traction means including a pair of rollers and tensioning means connected therebetween for causing non-slipping rolling motion of the bar on the flexible member.

CLYDE A. YOUNG.